United States Patent [19]

Lukashuk

[11] Patent Number: 5,327,977

[45] Date of Patent: Jul. 12, 1994

[54] WEEDER WITH HOLLOW TINES

[76] Inventor: Anthony Lukashuk, R.R. #3, Comp. 7, site 35, Prince George, British Columbia, Canada, V2N 2J1

[21] Appl. No.: 990,266

[22] Filed: Dec. 14, 1992

[51] Int. Cl.$^5$ ............................................. A01B 1/00
[52] U.S. Cl. ................................... 172/376; 132/324
[58] Field of Search ............... 172/376, 371, 372, 377; 132/323-325, 327, 328

[56] References Cited

U.S. PATENT DOCUMENTS

| | | | |
|---|---|---|---|
| 1,050,721 | 1/1913 | Dickson . | |
| 1,180,620 | 4/1916 | Stuart | 132/324 |
| 1,184,052 | 5/1916 | Turner et al. | 132/324 |
| 1,274,423 | 8/1918 | Kristmann | 132/324 |
| 2,056,007 | 9/1936 | Jaenichen . | |
| 2,148,066 | 2/1939 | Fox | 132/324 |
| 2,397,786 | 2/1946 | Gascoigne et al. . | |
| 3,378,017 | 4/1968 | Stiles | 132/324 |
| 4,518,000 | 5/1985 | Leverette | 132/325 |
| 4,898,196 | 2/1990 | Eason | 132/327 |
| 5,060,681 | 10/1991 | Westbrook et al. | 132/324 |
| 5,085,236 | 2/1992 | Odneal et al. | 132/324 |

FOREIGN PATENT DOCUMENTS

| | | | |
|---|---|---|---|
| 13688 | 3/1925 | Denmark | 172/376 |
| 44036 | 4/1931 | Denmark | 172/376 |

*Primary Examiner*—Randolph A. Reese
*Assistant Examiner*—Spencer Warnick
*Attorney, Agent, or Firm*—Norman M. Cameron

[57] ABSTRACT

A cultivator includes a handle having a lower end with a tool member connected thereto. The tool member has first and second spaced-apart tines, each of the tines having an outer tip and being tubular with a longitudinal interior hollow extending to the tip. A flexible member, such as a wire, extends from the hollows of the times and between the tips thereof. There are devices for securing the flexible member in tension between the tips of the tines. Preferably the tines have outer portions which are thinner and harder than inner portions of the tines. For example, the outer portion of each tine may be a tubular insert telescopically received within the inner portion. The devices for securing the wire may include a reel secured to one end of the wire.

8 Claims, 2 Drawing Sheets

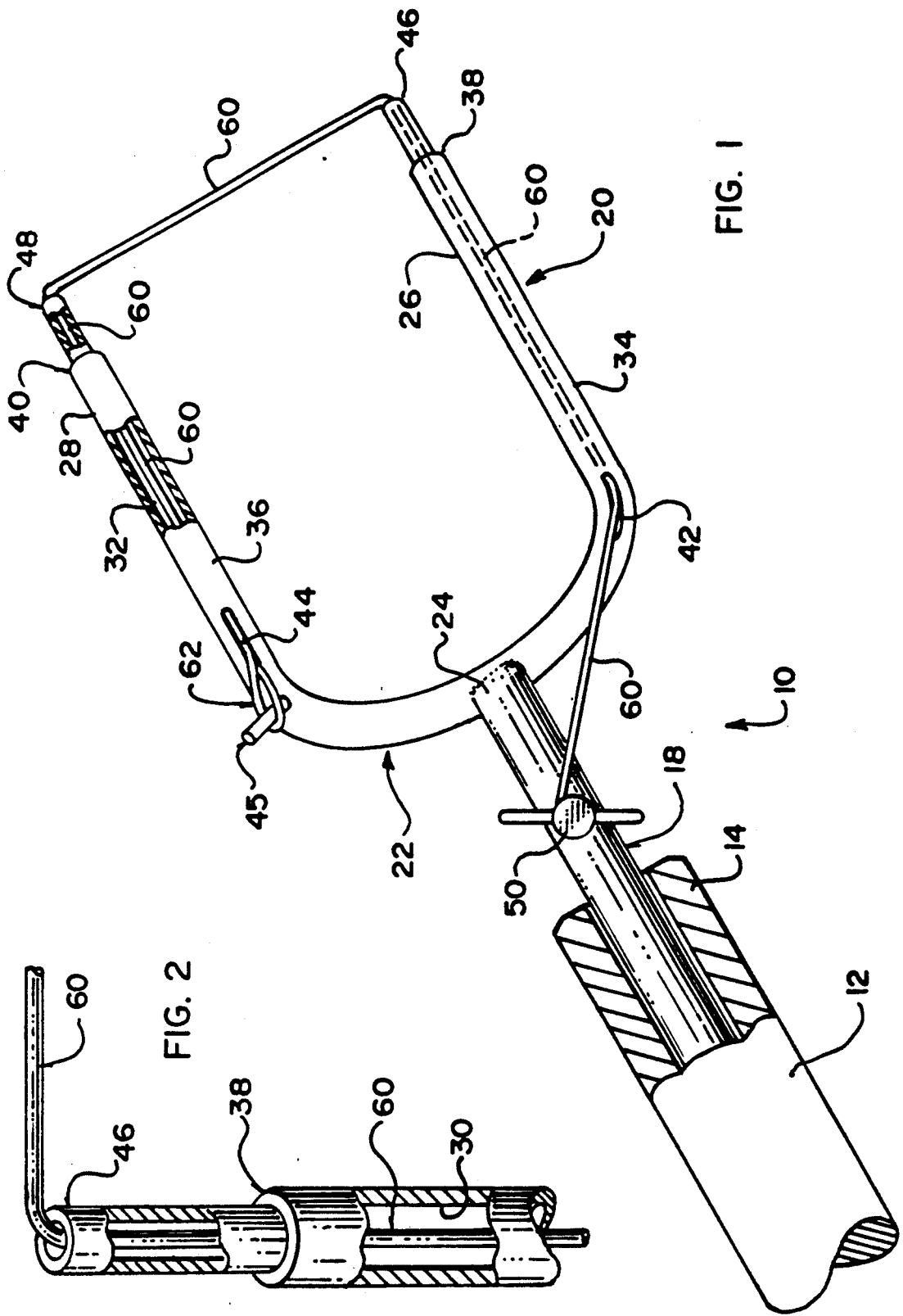

WEEDER WITH HOLLOW TINES

BACKGROUND OF THE INVENTION

This invention relates to weeders and cultivators, particularly the type having spaced-apart tines with a tensioned wire extending therebetween.

Many tools have been devised in the past for weeding gardens and otherwise cultivating the soil. These include hoes, weeders with blades or rotary devices which chop weeds, and in the process move large amounts of soil, sometimes replanting the weeds elsewhere. Some of these tools penetrate deeply into the soil and can cause damage to the roots of crops. Many of the earlier tools are bulky so it is difficult to weed in close proximity to plants without causing damage, particularly very small nursery plants. In addition, many such cultivators are not suitable for dry, sandy soil because turning over large volumes of soil causes loss of critical moisture.

A class of cultivator is known which is somewhat rake like, having an elongated handle with spaced-apart tines at the bottom end thereof. A tensioned wire extends between the tines. Examples are seen in U.S. Pat. Nos. 2,056,007 to Jaenichen, 1,050,721 to Dickson and 2,397,786 to Gascoigne. While such devices theoretically present a solution to the problem of hand weeding, particularly in sandy soil, they have not achieved widespread acceptance. Some of these tools, for example, have relatively broad outer tines so that they cannot weed closely to small plants. In addition, many such tools do not allow for easy replacement and tensioning of the wire, causing inconvenience for the gardener.

Accordingly, it is an object of the invention to provide an improved cultivator or weeder of this type having tines which are strong, but thin adjacent the wire so that the tool can cultivate close to small plants without causing damage.

It is another object of the invention to provide a tool of this class where the wire can be easily replaced and the tension can be conveniently adjusted without requiring special tools.

It is a further object of the invention to provide a tool of this type which is simple and robust in construction so that it can be built economically and yet provide convenient and reliable operation over a long period of time.

SUMMARY OF THE INVENTION

In accordance with these objects, the invention provides a cultivator which has a handle with a lower end. A tool member is connected to the lower end of the handle. The tool member has first and second spaced-apart tines. Each of the tines has an outer tip and is tubular with a longitudinal interior hollow extending to the tip. A flexible member extends from the hollows of the tines and between the tips thereof. There is means for securing the flexible member in tension between the tips of the tines.

Preferably, each of the tines has an inner portion and a outer portion adjacent the tip. The outer portion is thinner and harder than the inner portion. For example, the outer portion may be a tubular insert telescopically received within the inner portion and having an outer opening. The flexible member extends through the outer openings of the tubular inserts.

The means for securing may include a reel. The flexible member has a first end secured to the reel.

In one preferred example, each of the tines has an outside and a side opening spaced-apart from the tip thereof which communicates with the interior hollow. The flexible member is a wire extending from the side opening in a first of the tines to the reel. The wire has a second end, a second of the tines having an anchor securing the second end of the wire.

Preferably, the reel has a tapered shaft extending through a circular opening in the tool member. The reel can be rotated when pulled outwardly from the tool member and is non-rotatably secured when pressed towards the tool member.

BRIEF DESCRIPTION OF THE DRAWINGS

In the drawings:

FIG. 1 is a plan view of a cultivator according to an embodiment of the invention, the handle being partly broken away;

FIG. 2 is a fragmentary isometric view of the tip of one of the tines thereof;

DESCRIPTION OF THE PREFERRED EMBODIMENTS

Figure 3:
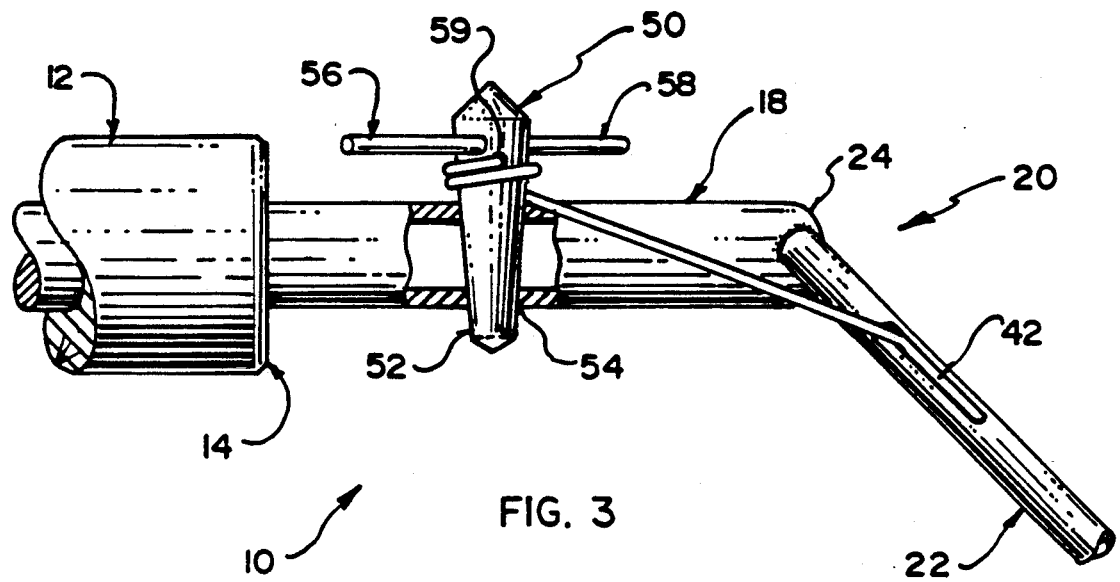
FIG. 3 is a fragmentary elevation showing part of the tang thereof and the reel for tensioning the wire which extends between the tines thereof.

Referring to the drawings, a cultivator or weeder is shown generally at 10. This includes an elongated handle 12 which in this case is a wooden pole although other materials could be used. This particular handle has a lower end 14, referring to its position in use. End 14 has a cylindrical socket 16 therein which tightly receives cylindrical tang 18 of a tool member shown generally at 20. The tool member in this example is of steel and has a U-shaped member 22 connected to end 24 of the tang. The U-shaped member forms a pair of spaced-apart tines 26 and 28 which are tubular, having interior hollows 30 and 32 respectfully. The tines 26 and 28 have outsides 34 and 36 and outer tips 38 and 40, respectively. The tines have side openings 42 and 44 which are spaced-apart upwardly from the tips thereof and extend from the outside of each tine to the interior hollow thereof. In this particular example the side openings are relatively narrow slits extending parallel to the tines. There is a pin 45 connected to tine 28 adjacent elongated side opening 44 between the side opening and the tang.

The tines 26 and 28 have inserts 46 and 48 extending outwardly from the tips 38 and 40 thereof. As seen in better detail in FIG. 2 for insert 46, each of the inserts is in the form of a narrower length of tubing telescopically received within the tip of the tine. In this example the inserts are of a harder material than the tines, stainless steel in this instance. Thus they are relatively strong despite the fact that they are significantly narrower than the tines.

Cultivator 10 includes a small reel 50 mounted on the tang thereof. As seen in better detail in FIG. 3, the reel 50 resembles a small thumb screw having a tapered shaft 52 extending through a circular opening 54 in the tang. The shaft has a small, wire-receiving opening 59. Handle members 56 and 58 extend perpendicularly outwards from the shaft to form a thumb screw. It may be appreciated that the shaft can be rotated by the handle members when the shaft is pulled outwardly from the tang. However, when the shaft is pressed towards the tang, it jams in the tang because of its tapered shape, thus preventing rotation of the reel.

Figure 4:
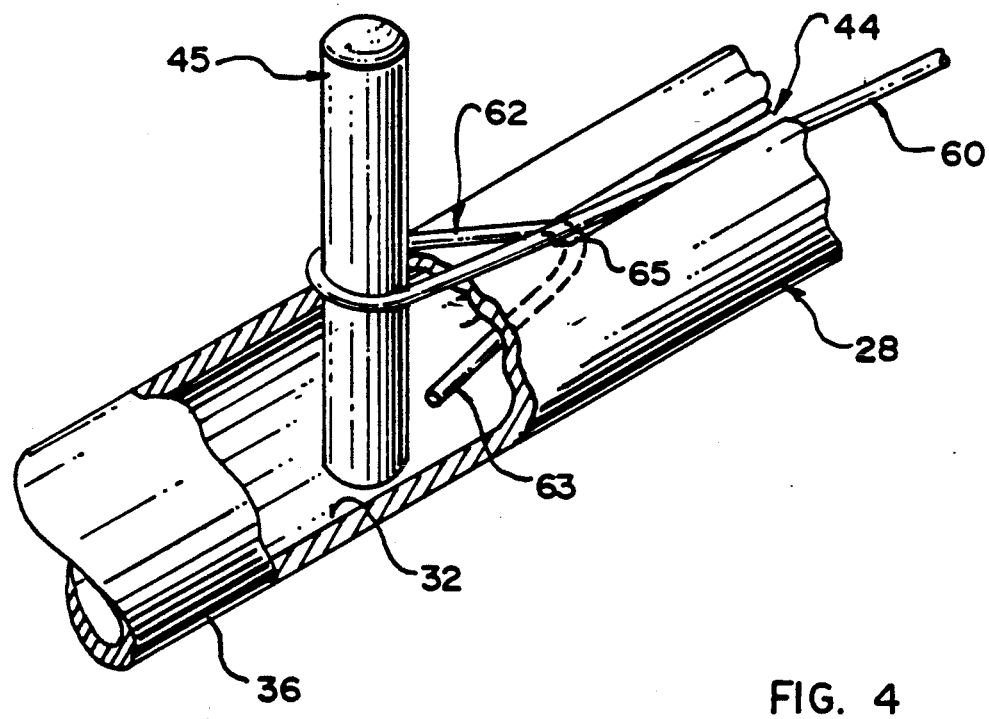
FIG. 4 is an enlarged, fragmentary view of one of the tines of the cultivator of FIG. 1 showing the pin and wire connected thereto.

A wire 60, of stainless steel in this example, extends between the inserts 46 and 48 at the tips of the tines as seen in FIG. 1. The reel and pin 45 serve as means for securing the wire in tension between the tips of the tines. A loop 62 at one end of the wire is fitted about pin 45. This is formed by inserting end 63 of the wire through opening 44 towards pin 45 until it contacts the pin within the interior hollow 32 of tine 28 as seen in FIG. 4. The wire is then bent back towards the pin, forming a hook 65 which engages the tine adjacent the opening 44. The wire is then wrapped around pin, forming loop 62 and inserted back into the opening 44 and directed towards tip 40 of the tine. After the wire emerges from insert 48 it is pushed back through insert 46 and tine 26 until it emerges through side opening 42. The wire then extends to the reel 50 where it passes through opening 59 in the shaft thereof. The wire is tensioned by rotating the reel and then held in tension by pressing the shaft of the reel into the tang 18.

In use, the wire 60 is guided through the soil ¼ to ½ inch deep, slicing roots and stems of weeds and leaving them with the appearance of being untouched. However, they subsequently die and decompose. It may appreciated that it is primarily intended for sandy and loose soils which permit this type of cultivation.

The cultivator can also be used as a soil conditioner by lowering the wire four to six inches into the soil and applying a rotary action. This process fluffs the soil, creating an excellent bed to plant seed.

The thin inserts on the tips of the tines allow the operator to weed close to the crops, virtually touching small or large plants and weeding away from the plants without damage.

A long handle 12 may be used when the gardener is in the standing position or a short handle may be used when the gardener is kneeling or crouching.

It will be understood that many of the details provided above are by way of example only and can be altered or deleted without departing from the scope of the invention which is to be determined with reference to the following claims.

What is claimed is:

1. A cultivator comprising:
    a handle having a lower end;
    a tool member connected to the lower end of the handle, the tool member having first and second spaced-apart tines, each of the tines having an outer tip and being tubular with a longitudinal interior hollow extending to the tip, each of the having an inner portion and an outer portion adjacent the tip, the outer portion being thinner and harder than the inner portion, the outer portion being a tubular insert telescopically received within the inner portion and having an outer opening;
    a flexible member extending from the hollows of the tines and between the tips thereof, the flexible member extending through the outer openings of the tubular inserts; and
    means for securing the flexible member in tension between the tips of the tines.

2. A cultivator as claimed in claim 1, wherein each of the tines has an inner portion and an outer portion adjacent the tip, the outer portion being thinner and harder than the inner portion.

3. A cultivator as claimed in claim 2, wherein the outer portion is a tubular insert telescopically received within the inner portion and having an outer opening, the flexible member extending through the outer openings of the tubular inserts.

4. A weeder comprising:
    an elongated handle having a lower end with a socket therein;
    a tool member having a tang with a first end fitted within the socket of the handle, a circular opening, a U-shaped member connected to a second end of the tang, the U-shaped member having first and second spaced-apart tines, each of the tines being tubular and having an outside, a tip, and a longitudinal interior hollow which extends to the tip, each of the tips having a hardened tubular insert telescopically fitted within said each tip, the inserts being narrower than the tines, a thumb screw with a tapered shaft being fitted within the circular opening in the tang, the tines each having a side opening spaced-apart from the tip and extending from the outside of said each tine to the interior hollow thereof, said second tine having a pin on the outside adjacent the side opening thereof; and
    a wire having a hook formed thereon which engages the side opening of the second tine and is directed towards the pin, the wire extends from the hook and is wrapped around the pin, forming a loop, the wire extends from the loop through the side opening of the second tine, through the interior hollow of the second tine to the insert in the tip thereof and then to the insert in the tip of the first tine, through the interior hollow of the first tine, emerging from the side opening thereof and having a second end secured to the shaft of the thumb screw.

5. A cultivator comprising:
    a handle having a lower end;
    a tool member connected to the lower end of the handle, the tool member having first and second spaced-apart tines, each of the tines having an outer tip and being tubular with a longitudinal interior hollow extending to the tip, each of the tines having an outside and a side opening spaced-apart from the tip thereof which communicates with the interior hollow;
    a flexible member extending from the hollows of the tines and between the tips thereof, the flexible member being a wire; and
    means for securing the flexible member in tension between the tips of the tines, the means for securing including a reel, the wire having a first end secured to the reel, the wire extending from the side opening in a first of the tines to the reel, the wire having a second end, a second of the tines having an anchor securing the second end of the wire.

6. A cultivator as claimed in claim 5, wherein the side opening in the second time is elongated, the anchor being a pin on the outside of the second tine, the second end of the wire forming a loop extending from the side opening in the second tine and about the pin.

7. A cultivator as claimed in claim 6, wherein the second end of the wire has a hook formed thereon which is directed towards the pin and engages the second tine adjacent the side opening therein, the wire extending from the hook, being wrapped about the pin to form said loop and then passing through the side opening of the second tine towards the tip thereof.

8. A cultivator comprising:

a handle having a lower end;

a tool member connected to the lower end of the handle, the tool member having first and second spaced-apart tines and a circular opening each of the tines having an outer tip and being tubular with a longitudinal interior hollow extending to the tip;

a flexible member extending from the hollows of the tines and between the tips thereof; and means for securing the flexible member in tension between the tips of the tines, the means for securing including a reel, the flexible member having a first end secured to the reel, the reel having a tapered shaft extending through the circular opening in the tool member, whereby the reel can be rotated when pulled outwardly away from the tool member and non-rotatably secured when pressed towards the tool member.

* * * * *